(12) United States Patent
Mouridsen (10) Patent No.: US 10,491,137 B2
(45) Date of Patent: *Nov. 26, 2019

(54) POWER SUPPLY CONTROL (71) Applicant: SCHNEIDER ELECTRIC IT CORPORATION, West Kingston, RI (US)

(72) Inventor: Jonas Sonsby Mouridsen, Odense V (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,584

(22) PCT Filed: May 1, 2014

(86) PCT No.: PCT/US2014/036328
§ 371 (c)(1),
(2) Date: Oct. 28, 2016

(87) PCT Pub. No.: WO2015/167568
PCT Pub. Date: Nov. 5, 2015

(65) Prior Publication Data
US 2017/0054383 A1 Feb. 23, 2017

(51) Int. Cl.
*H02M 7/487* (2007.01)
*H02M 1/42* (2007.01)
(Continued)

(52) U.S. Cl.
CPC ............. *H02M 7/487* (2013.01); *H02J 9/061* (2013.01); *H02J 9/062* (2013.01);
(Continued)

(58) Field of Classification Search
CPC .... H02M 7/487; H02M 1/4208; H02M 5/458; H02M 1/4225; H02M 1/12;
(Continued)

(56) References Cited

U.S. PATENT DOCUMENTS 4,443,841 A  4/1984 Mikami et al.
4,709,317 A  11/1987 Iizuka et al.
(Continued)

FOREIGN PATENT DOCUMENTS

CN  2363412 Y  2/2000
WO  2013070237 A1  5/2013
(Continued)

OTHER PUBLICATIONS

Received STIC search report from EIC2800 searcher Mesfin Getaneh on Jun. 30, 2017.*

(Continued)

*Primary Examiner* — Nguyen Tran
*Assistant Examiner* — Htet Z Kyaw
(74) *Attorney, Agent, or Firm* — Lando & Anastasi, LLP (57) ABSTRACT

According to one aspect, embodiments of the invention provide a power supply system comprising a power factor correction circuit coupled to an input and configured to draw input current from the input, an inverter coupled to an output and configured to provide output current to the output, a bus coupled to the power factor correction circuit and the inverter, and a switching circuit, the switching circuit configured to direct power from the power factor correction circuit to the inverter in a first mode of operation and from the bus to the inverter in a second mode of operation, wherein the switching circuit includes a neutral clamp circuit coupled to the power factor correction circuit and the inverter, the neutral clamp circuit configured to control a level of the input current drawn by the power factor correc- (Continued)

tion circuit and a level of the output current provided by the inverter.

21 Claims, 4 Drawing Sheets

(51) Int. Cl.
*H02M 5/458* (2006.01)
*H02J 9/06* (2006.01)

(52) U.S. Cl.
CPC ....... *H02M 1/4208* (2013.01); *H02M 1/4225* (2013.01); *H02M 5/458* (2013.01); *H02J 2009/063* (2013.01); *Y02B 70/126* (2013.01)

(58) Field of Classification Search
CPC .. H02M 1/4233; H02M 1/4241; H02M 1/425; H02M 1/4258; H02M 2001/4283; H02M 2001/4291; H02M 1/126; H02M 1/4216; H02M 1/4266; H02M 2001/4275; H02M 5/40; H02M 5/42; H02M 5/453; H02M 7/7575; H02M 5/45; H02M 5/4585; H02M 5/4505; H02M 5/451; H02M 5/452; H02M 7/217; H02M 7/219; H02M 1/045; H02M 7/151; H02M 3/33507; H02M 3/33523; H02M 7/48; H02M 3/305; H02M 7/538463; H02M 7/53854; H02M 7/75; H02M 3/28; H02M 3/315; H02M 3/335; H02M 7/515; H02M 7/53; H02M 7/537; H02M 7/538466; H02M 7/53862; H02M 7/757; H02M 7/521; H02M 7/5387; H02M 7/53871; H02M 7/53875; H02M 1/081; H02M 7/00; H02M 7/04; H02M 7/06; H02J 9/061; H02J 9/062; H02J 2009/063; H02J 3/16; H02J 3/1807; H02J 3/1814; H02J 3/36; H02J 7/12; Y02B 70/126; G05F 1/70; G05F 1/32; G05F 1/33; G05F 1/38; G05F 1/34; G05F 1/42; G05F 1/52; G05F 1/44; H02H 7/261; H02H 7/268
USPC ............. 363/131, 21.05, 123, 34–37, 84–98, 363/125–127; 323/222–225, 282–283, 323/207–209
See application file for complete search history.

(56) References Cited

U.S. PATENT DOCUMENTS

| | | | | |
|---|---|---|---|---|
| 4,730,242 A * | 3/1988 | Divan | ................. | H02M 5/4585 363/127 |
| 5,017,800 A * | 5/1991 | Divan | ................. | H02J 9/062 307/66 |
| 6,169,669 B1 | 1/2001 | Choudhury | | |
| 6,295,215 B1 * | 9/2001 | Faria | ................. | H02J 9/062 363/124 |
| 6,944,035 B2 * | 9/2005 | Raddi | ................. | H02J 9/062 307/64 |
| 7,050,312 B2 * | 5/2006 | Tracy | ................. | H02J 9/062 307/66 |
| 7,295,451 B2 | 11/2007 | Charles | | |
| 7,446,433 B2 * | 11/2008 | Masciarelli | ............. | H02J 9/062 307/66 |
| 7,508,094 B2 | 3/2009 | Johnson, Jr. et al. | | |
| 7,615,891 B2 * | 11/2009 | Wu | ................. | H02J 9/062 307/66 |
| 7,652,393 B2 * | 1/2010 | Moth | ................. | H02J 9/062 307/64 |
| 8,143,744 B2 * | 3/2012 | Nielsen | ................. | H02J 9/062 307/66 |
| 8,816,533 B2 * | 8/2014 | Navarro | ................. | H02J 9/061 307/64 |
| 9,214,854 B2 * | 12/2015 | Chen | ................. | H02M 1/4208 |
| 9,531,288 B2 * | 12/2016 | Bush | ................. | H02J 3/24 |
| 9,819,221 B2 | 11/2017 | Yang et al. | | |
| 10,200,028 B2 * | 2/2019 | Laven | ................. | H01L 29/872 |
| 10,211,672 B2 * | 2/2019 | Mouridsen | ............. | H02J 9/062 |
| 2003/0048006 A1 * | 3/2003 | Shelter, Jr. | ............. | H02J 9/061 307/64 |
| 2005/0036248 A1 | 2/2005 | Klikic et al. | | |
| 2005/0201127 A1 * | 9/2005 | Tracy | ................. | H02J 9/062 363/37 |
| 2005/0286274 A1 * | 12/2005 | Pfitzer | ................. | G01R 31/40 363/37 |
| 2006/0138867 A1 | 6/2006 | Tian et al. | | |
| 2006/0152085 A1 * | 7/2006 | Flett | ................. | B60L 9/30 307/75 |
| 2009/0196072 A1 * | 8/2009 | Ye | ................. | H02M 7/493 363/17 |
| 2009/0201703 A1 * | 8/2009 | Klikic | ................. | H02J 9/062 363/41 |
| 2009/0256422 A1 * | 10/2009 | Fox | ................. | H02J 9/062 307/23 |
| 2011/0031911 A1 | 2/2011 | Marcinkiewicz et al. | | |
| 2012/0074786 A1 * | 3/2012 | Johnson, Jr. | ............. | H02J 9/062 307/66 |
| 2012/0119581 A1 * | 5/2012 | Silberbauer | ............. | H02J 9/06 307/66 |
| 2012/0181871 A1 | 7/2012 | Johansen et al. | | |
| 2013/0026835 A1 * | 1/2013 | Ghosh | ................. | H02J 9/062 307/66 |
| 2013/0076141 A1 | 3/2013 | Paulakonis et al. | | |
| 2014/0268959 A1 * | 9/2014 | Frohman | ................. | H02M 7/797 363/98 |
| 2015/0200602 A1 * | 7/2015 | Narimani | ............ | H02M 5/4585 363/37 |
| 2016/0006295 A1 * | 1/2016 | Yang | ................. | H02J 9/062 307/66 |
| 2016/0268839 A1 * | 9/2016 | Mouridsen | .......... | H02M 1/4208 |
| 2017/0018959 A1 * | 1/2017 | Yu | ................. | H02J 9/061 |
| 2017/0149346 A1 * | 5/2017 | Mouridsen | .......... | H02M 5/4585 |
| 2017/0163086 A1 * | 6/2017 | Bach | ................. | H02J 9/061 |

FOREIGN PATENT DOCUMENTS

| | | |
|---|---|---|
| WO | 20130151528 A1 | 10/2013 |
| WO | 2014044089 A1 | 3/2014 |
| WO | 2015065363 A1 | 5/2015 |

OTHER PUBLICATIONS

Received STIC search report from EIC2800 searcher Samir Patel on Jun. 30, 2017.*
Received STIC search report from EIC 2800 searcher John DiGeronimo on Jul. 24, 2018.*
Received STIC search report from EIC 2800 searcher John DiGeronimo on Feb. 12, 2019. (Year: 2019).*
Notification of Transmittal of the International Search Report and the Written Opinion of the International Searching Authority from corresponding PCT/US2014/036328 dated Sep. 25, 2014.
Extended European Search Report from corresponding European Application No. 14890848.6 dated Nov. 27, 2017.

* cited by examiner

POWER SUPPLY CONTROL

CROSS-REFERENCE TO RELATED APPLICATIONS

This application is a U.S. National Stage Application under 35 U.S.C. § 371 of International Application No. PCT/US2014/036328, filed May 1, 2014, titled POWER SUPPLY CONTROL, which is hereby incorporated herein by reference in its entirety.

BACKGROUND

1. Field of the Disclosure

Embodiments of the present disclosure relate generally to systems and methods for providing power.

2. Description of Background

A power supply, such as an uninterruptible power supply (UPS) is typically used to provide power to an electrical device, or load. A UPS can provide power while a primary power source, or mains, is unavailable. A conventional online UPS rectifies input power provided by an electric utility using a power factor correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is powered either by mains or the battery, the output power of the UPS is uninterrupted if the mains fails and the battery is sufficiently charged.

SUMMARY

At least some aspects and embodiments of the invention are directed toward a power supply system comprising an input configured to receive input power from an input power source, an output configured to provide output power to a load, a power factor correction circuit coupled to the input and configured to draw input current from the input, an inverter coupled to the output and configured to provide output current to the output, a bus coupled to the power factor correction circuit and the inverter, and a switching circuit coupled to the inverter, the switching circuit configured to direct power from the power factor correction circuit to the inverter in a first mode of operation and from the bus to the inverter in a second mode of operation, wherein the switching circuit includes a neutral clamp circuit coupled to the power factor correction circuit and the inverter, the neutral clamp circuit configured to control a level of the input current drawn by the power factor correction circuit and a level of the output current provided by the inverter to the output.

According to one embodiment, the switching circuit is configured to direct an alternating current from the power factor correction circuit to the inverter in the first mode of operation, bypassing the bus.

According to another embodiment, the power supply system further comprises a controller coupled to the switching circuit and configured to provide control signals to the switching circuit. In one embodiment, the controller is configured to monitor at least one electrical characteristic of the power supply system, and provide control signals to operate the switching circuit in at least one of the first mode of operation, the second mode of operation, and a combination of the first and second modes of operation, based on the at least one electrical characteristic. In another embodiment, in providing control signals to operate the switching circuit, the controller is further configured to provide control signals to the neutral clamp circuit to adjust a duty cycle of the neutral clamp circuit to regulate at least one of the level of the input current drawn by the power factor correction circuit and the level of the output current provided by the inverter to the output. In another embodiment, in providing control signals to operate the switching circuit, the controller is further configured to provide control signals to the switching circuit to adjust a duty cycle of the switching circuit to control an amount of power being transferred between the power factor correction circuit, the bus, and the inverter.

According to one embodiment, the controller is further configured to monitor the input current drawn by the power factor correction circuit, determine whether the input current drawn by the power factor correction circuit is less than a reference input current level, and provide, in response to determining that the input current drawn by the power factor correction circuit is less than the reference input current level, control signals to the neutral clamping circuit to increase a first duty cycle of the neutral clamping circuit to increase the input current drawn by the power factor correction circuit. In one embodiment, the controller is further configured to provide, in response to determining that the input current drawn by the power factor correction circuit is greater than the reference input current level, control signals to the neutral clamping circuit to decrease the first duty cycle of the neutral clamping circuit to decrease the input current drawn by the power factor correction circuit.

According to another embodiment, the controller is further configured to determine whether the output current provided by the inverter is less than a reference output current level, and provide, in response to determining that the output current provided by the inverter is less than the reference output current level, control signals to the switching circuit to increase a duty cycle of the switching circuit to increase the output current provided by the inverter. In one embodiment, the controller is further configured to provide, in response to determining that the output current provided by the inverter is greater than the reference output current level, control signals to the neutral clamping circuit to increase a second duty cycle of the neutral clamping circuit to decrease the output current provided by the inverter.

One aspect of the invention is directed to a method of controlling a power supply system comprising an input configured to receive input power from an input power source, an output configured to provide output power to a load, a power factor correction circuit coupled to the input and configured to draw input current from the input, an inverter coupled to the output and configured to provide output current to the output, a bus coupled to the power factor correction circuit and the inverter, and a switching circuit coupled to the inverter, the switching circuit including a neutral clamp circuit coupled to the power factor correction circuit and the inverter, the method comprising determining one or more electrical characteristics of the power supply system, based on determining, providing control signals to operate the switching circuit in one of a first mode of operation to direct power from the power factor correction circuit to the inverter or a second mode of operation to direct power from the bus to the inverter, and based on determining, providing control signals to operate the neutral clamp circuit to regulate a level of the input current drawn by the power factor correction circuit and a level of the output current provided by the inverter to the output.

According to one embodiment, operating the switching circuit in the first mode of operation comprises directing an alternating current from the power factor correction circuit to the inverter, bypassing the bus. In one embodiment, providing control signals includes providing control signals to operate the switching circuit in at least one of the first mode of operation, the second mode of operation, and a combination of the first and second modes of operation based on the one or more electrical characteristics. In another embodiment, providing control signals to operate the neutral clamp circuit includes providing control signals to the neutral clamp circuit to control a duty cycle of the neutral clamp circuit to regulate the level of the input current drawn by the power factor correction circuit and the level of the output current provided by the inverter to the output. In another embodiment, providing control signals includes providing control signals to the switching circuit to adjust a duty cycle of the switching circuit to control an amount of power being transferred between the power factor correction circuit, the bus, and the inverter.

According to another embodiment, determining one or more electrical characteristics comprises monitoring the input current drawn by the power factor correction circuit, and determining whether the input current drawn by the power factor correction circuit is less than a reference input current level, wherein providing control signals to operate the neutral clamp circuit includes providing, in response to determining that the input current drawn by the power factor correction circuit is less than the reference input current level, control signals to the neutral clamping circuit to increase a first duty cycle of the neutral clamping circuit to increase the input current drawn by the power factor correction circuit. In one embodiment, providing control signals to operate the neutral clamp circuit includes providing, in response to determining that the input current drawn by the power factor correction circuit is greater than the reference input current level, control signals to the neutral clamping circuit to decrease the first duty cycle of the neutral clamping circuit to decrease the input current drawn by the power factor correction circuit.

According to one embodiment, determining one or more electrical characteristics comprises monitoring the output current provided by the inverter, and determining whether the output current provided by the inverter is less than a reference output current level, wherein providing control signals to operate the switching circuit includes providing, in response to determining that the output current provided by the inverter is less than the reference output current level, control signals to the switching circuit to increase a duty cycle of the switching circuit to increase the output current provided by the inverter. In one embodiment, providing control signals to operate the neutral clamp circuit includes providing, in response to determining that the output current provided by the inverter is greater than the reference output current level, control signals to the neutral clamping circuit to increase a second duty cycle of the neutral clamping circuit to decrease the output current provided by the inverter.

Another aspect of the invention is directed to a power supply system comprising an input configured to receive input power from an input power source, an output configured to provide output power to a load, a power factor correction circuit coupled to the input and configured to draw input current from the input, an inverter coupled to the output and configured to provide output power to the output, a DC bus coupled to the power factor correction circuit and the inverter, and means for operating the power supply system in a hybrid mode to generate desired input and output power of the power supply system, the hybrid mode at least partially bypassing the DC bus, and for controlling a level of the input current drawn by the power factor correction circuit and a level of the output current provided by the inverter with a shared portion of the power supply system.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

A UPS system typically includes an input for receiving an input AC power, a power factor correction (PFC) circuit, which converts the AC power to DC power, a DC bus, an inverter, which converts the DC power back to AC power, and an output, which provides output AC power. At least some aspects and embodiments are directed to methods and apparatuses for a hybrid mode of a UPS, which guides power directly from the PFC circuit to the inverter, bypassing conversion of power from AC to DC. The hybrid mode can provide an increase in efficiency, while still providing control of input current and output voltage as well as surge handling capability, which may not be available in a bypass mode or eco-mode.

One or more features disclosed herein may be implemented in one or more controllers or apparatuses configured to control one or more UPS systems. In various embodiments, controllers disclosed herein may be included in one or more UPS systems or may be separate from one or more UPS systems being controlled. Example UPS systems upon which various aspects may be implemented and example UPS systems which may be controlled based on various aspects are discussed in more detail below.

It is to be appreciated that embodiments of the methods and apparatuses discussed herein are not limited in application to the details of construction and the arrangement of components set forth in the following description or illustrated in the accompanying drawings.

The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Figure 1:
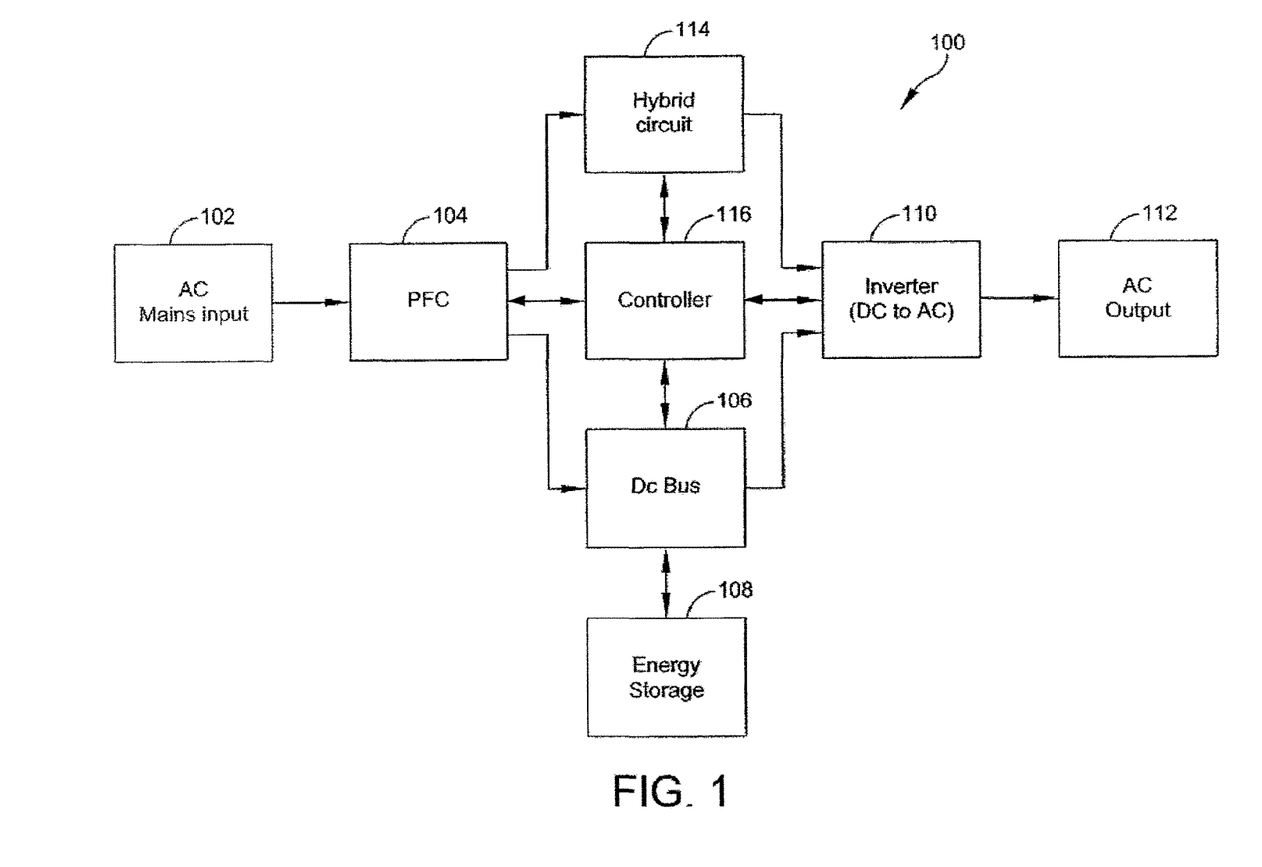
FIG. 1 is a block diagram of a UPS system according to aspects of the present disclosure.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. FIG. 1 shows a block diagram depicting an uninterruptible power supply (UPS) 100.

The uninterruptible power supply 100 includes an input 102, a power factor correction (PFC) circuit 104, a DC bus 106, a battery 108, an inverter 110, and an output 112. The UPS 100 also includes a hybrid circuit 114, which allows the UPS 100 to run in a hybrid mode and a controller 116, which provides instructions and commands to control the mode of the UPS 100. The input 102 receives input AC power from an AC power source. The PFC circuit 104 filters and rectifies the input AC power to convert the input AC power into DC power, as well as provide power factor correction. Traditionally, the PFC circuit 104 provides the DC power to the DC bus 106. The battery 108 or other energy storage component can also provide power to the DC bus 106, which provides DC power to the inverter 110. The inverter converts the DC power into AC power for the output 112. In some embodiments, the hybrid circuit 114 bypasses the conversion of AC power to DC power. Thus, the hybrid circuit 114 bypasses the DC bus 106. In some embodiments, the hybrid circuit 114 allows the UPS 100 to run in the hybrid mode and also in a traditional mode, depending on a configuration and/or environmental parameters. Environmental parameters can include measurable characteristics of the input and output power, including electrical characteristics such as voltage, current, frequency, power quality, and other characteristics. For example, the hybrid circuit 114 can include switches that allow the UPS 100 to run in the traditional mode, converting AC power to DC power and utilizing the traditional components of the UPS 100.

The mode(s) in which the UPS 100 operates can be controlled by the controller 116 of the UPS 100. The controller 116 can receive inputs, such as environmental parameters and user inputs, which can determine whether the UPS 100 runs in a traditional mode, a hybrid mode, a bypass mode, other modes provided by the UPS 100, or some combination of modes. In hybrid mode, the controller 116 can allow current to pass through the hybrid circuit 114 as well as the DC bus 106 for portions of time depending on the environmental parameters. In some embodiments, the hybrid mode includes running in the traditional mode for portions of time. For example, the controller 116 can shift duty cycles of switches, as will be described further below, for varying amounts of time depending on the environmental parameters. In some embodiments, the controller 116 includes at least one processor or other logic device. In some embodiments, the controller 116 includes a digital signal processor (DSP). The controller 116 may also include at least one field programmable gate array (FPGA) and an application specific integrated circuit (ASIC), or other hardware, software, firmware, or combinations thereof. In various embodiments, one or more controllers may be part of the UPS 100, or external to but operatively coupled with the UPS 100.

In some embodiments, the controller 116 includes at least one control signal generator. The control signal generator may be part of the controller 116 or a separate device that outputs a control signal responsive, at least in part, to instructions from the controller 116. In some embodiments, the control signal generator includes at least one DSP and an FPGA. The control signal generator may generate, form, or otherwise output a control signal such as a pulse width modulation (PWM) control signal.

Figure 2:
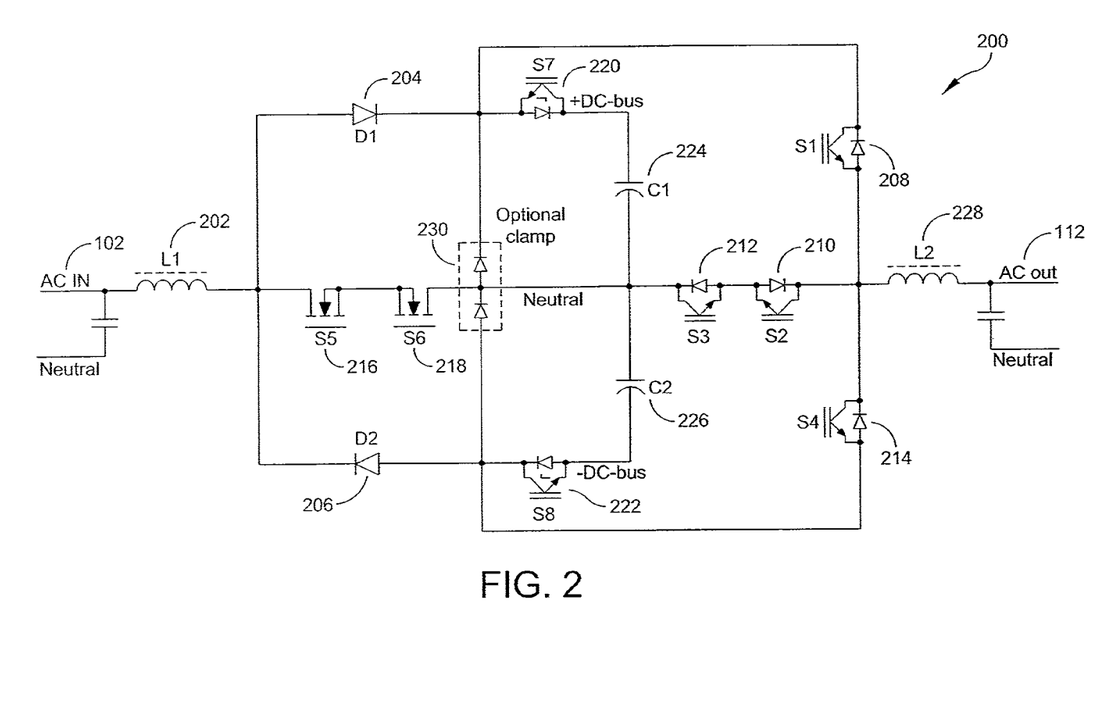
FIG. 2 is a circuit diagram of a portion of a UPS system according to aspects of the present disclosure.

FIG. 2 shows a diagram of an example circuit 200 of a portion of the UPS 100. The circuit 200 includes the input 102, which receives input AC power. The circuit 200 includes inductors L1 202 and L2 228, diodes D1 204 and D2 206, and a series of switches S1 208, S2 210, S3 212, S4 214, S5 216, S6 218, S7 220, and S8 222 which can control the flow of power through the circuit 200. In some embodiments, the switches S1-S8 208-222 are implemented as power transistors, such as metal oxide semiconductor field-effect transistors (MOSFETs) or insulated gate bipolar transistors (IGBTs). In some embodiments, two switches, S7 220 and S8 222, allow the UPS 100 to run in hybrid mode. Replacing the switches S7 220 and S8 222 with short circuits would result in a PFC circuit and a 3-level NPC-2 inverter. The switches S7 220 and S8 222 allow the circuit 200 to guide current from the PFC 104 to either the DC bus 106 (through switches S7 220 or S8 222 internal diode) or directly to the inverter 110 through switches S1 208 and S4 214. If the PFC input current is higher than inverter output current, excess current can flow to the DC bus 106 through switch S7 220. If the PFC input current is lower than inverter output current, switches S7 220 and S8 222 can be partially turned on to guide extra power from the DC bus 106 to the inverter output.

The input current to the PFC can be boosted and controlled by adjusting a duty cycle of switches S5 216 and S6 218. If input voltage is higher than output voltage, current can be limited by adjusting a duty cycle of S1 208 and S4 214. If the requested output current is higher than the input current, a duty cycle of S7 220 and S8 222 can be increased to draw power from the DC bus, boosting inverter output current to the requested level. Similarly, if input current is higher than output current, current from the PFC can freewheel to the DC bus through switches S7 220 and S8 222.

In some embodiments, when input voltage and output voltage are the same and load power factor is close to 1, S1 208 and S4 214 can remain almost constantly on and current can bypass the DC bus 106 for most of the time, which can minimize choke core losses and switching losses, as well as reduce conduction losses. The remaining switches, S5 216/S6 218, S7 220/S8 222 and S2 210/S3 212 can be turned on for short durations each switch cycle, to compensate for any differences in input and output current. The primary current path would then include D1 204 and S1 208 or D2 206 and S4 214, reducing junctions in the primary current path.

At a low output load power factor (e.g., a reactive load), the UPS 100 can operate in the traditional mode, directing current through the PFC circuit 104, the DC bus 106, and the inverter 110 by leaving S7 220 and S8 222 on. According to some embodiments, at a low output load power factor, the UPS 100 can also operate in the hybrid mode and partially guide AC power directly from the PFC input to the inverter output as current from the PFC input can automatically be divided between the DC bus 106 and the inverter 110. According to some embodiments, the UPS 100 can operate in both traditional and hybrid modes (by adjusting the duty cycles of the switches) to provide a desired output.

The hybrid circuit can be suitable for 208V and 400/480V systems as well as other voltages. In some embodiments, in 400V systems, S2 210, S3 212, S5 216, S6 218, S7 220, and S8 222 are 600V rated components, while D1 204, D2 206, S1 208, and S4 214 are rated for 1200V breakdown voltage. In some embodiments, in 208V systems, all components are 600V rated. In some embodiments, the UPS 100 includes a separate DC-DC converter for providing power to and receiving power from the battery 108 to the DC-bus 106.

Figure 3:
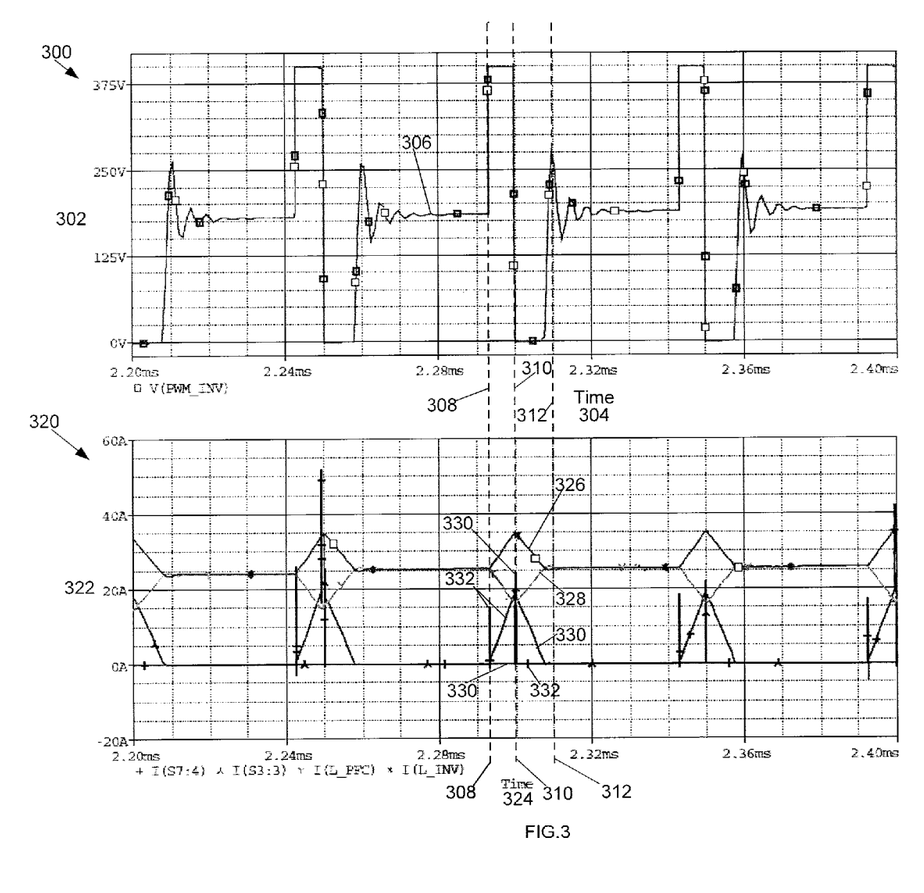
FIG. 3 includes graphs illustrating switching cycles of a UPS system according to aspects of the present disclosure.

FIG. 3 includes graphs 300 and 320 illustrating switching cycles of the UPS system 100. The y-axis of the first graph 300 represents voltage (in volts) and the x-axis of the first graph 300 represents time (in milliseconds). The trace 306 in the first graph 300 represents the Pulse Width Modulation (PWM) voltage of the inverter 110. The y-axis of the second graph 320 represents current (in Amps) and the x-axis of the second graph 320 represents time (in milliseconds). The first trace 326 in the second graph 320 represents inverter current of the UPS system 100. The second trace 328 in the second graph 320 represents PFC current of the UPS system 100. The third trace 330 in the second graph 320 represents current through switch S3 212. The fourth trace 332 in the second graph 320 represents current through switch S7 220.

At a first time 308, the switch S7 220 is turned on and the PWM voltage 306 of the inverter 110 increases. Assuming switch S1 208 is already turned on, the inverter current 326 is boosted with energy provided by the DC-bus 106 (via switch S7 220). At the same time, PFC current 328 free-wheels through D1 204 and switch S7 220 to the DC-bus 106 and as a result, decreases.

At a second time 310, the switch S7 220 is turned off and current 332 through switch S7 220 goes to zero. As a result, the PWM voltage 306 of the inverter 110 drops to zero as the inverter current 326 free-wheels via switch S2 210 and switch S3 212 (e.g., as seen in the current 330 through switch S3 212 illustrated in the second graph 320). As the inverter current 326 drops and the PFC current 328 increases, at time 312 the inverter current 326 and the PFC current 328 equalize. Once the inverter current 326 and the PFC current 328 are equal, the PWM voltage 306 of the inverter 110 settles on an average value between the input and output voltage of the UPS 100. At this time, the voltage across the PFC 104 and the inverter 110 is virtually zero and hence the change in current is also close to zero. According to one embodiment, losses at this time are also very low.

While the hybrid circuit 200 has been described with a specific topology, the bypassing of the DC bus can be achieved through various different topologies, with similar advantages as described above. Different embodiments of the disclosure provide power supplies in which power is directed from a PFC circuit to an inverter without fully converting AC power to DC power.

Figure 4:
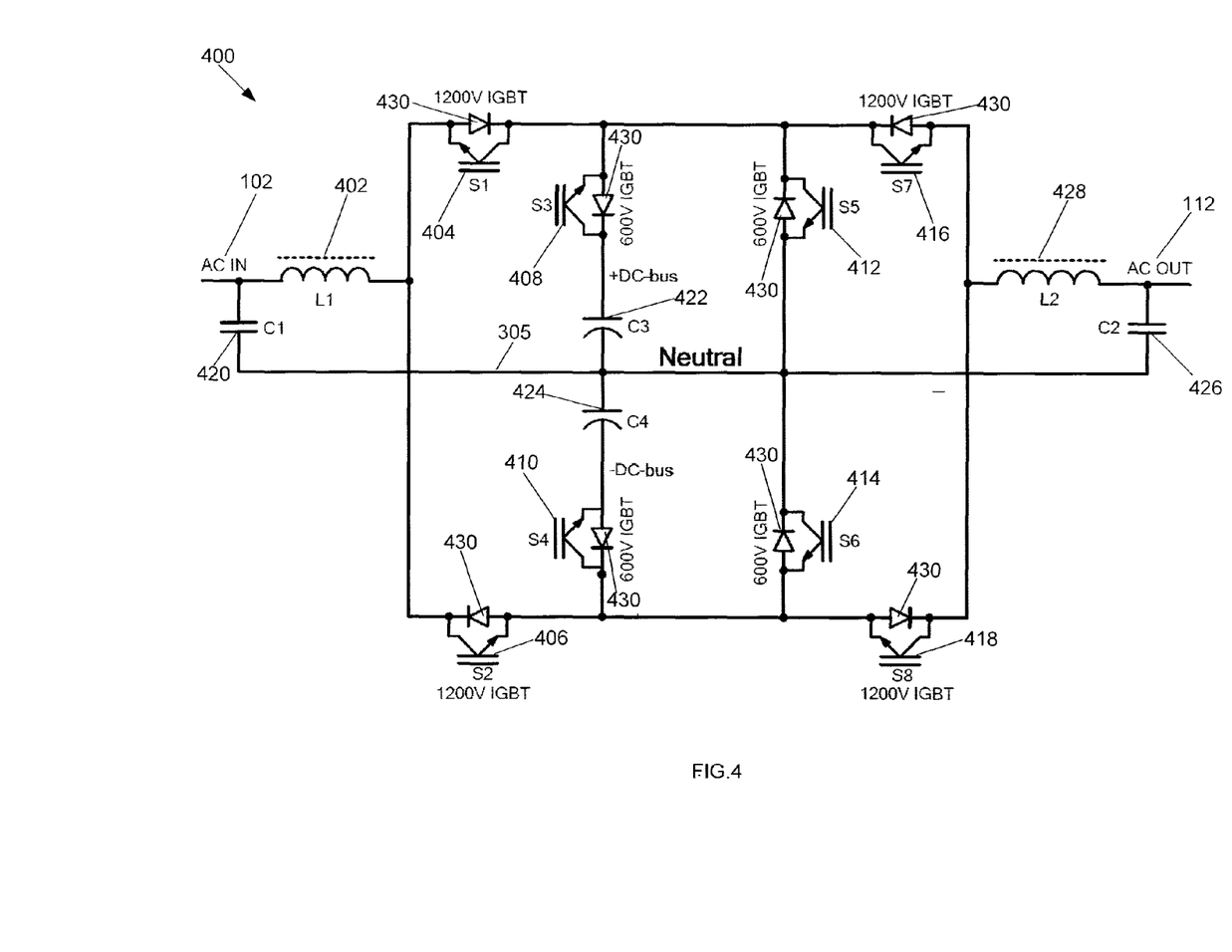
FIG. 4 is a circuit diagram of another embodiment of a portion of a UPS system according to aspects of the present disclosure.

FIG. 4 shows a diagram of another example circuit 400 that can be implemented in the UPS 100 to perform at least some of the functions of the PFC 104, hybrid circuit 114, DC bus 106 and inverter 110 of the UPS 100. The circuit 400 includes the input 102, which receives input AC power. The circuit 400 includes inductors L1 402 and L2 428, a series of capacitors C1 420, C2 426, C3, 422, C4 424, a neutral line 305, and a series of switches S1 404, S2 406, S3 408, S4 410, S5 412, S6 414, S7 416, and S8 418 which can control the flow of power through the circuit 400. In some embodiments, the switches S1-S8 404-418 are implemented as power transistors, such as metal oxide semiconductor field-effect transistors (MOSFETs) or insulated gate bipolar transistors (IGBTs). A diode 430 is coupled across each one of the switches 404-418.

The input 102 is coupled to a first terminal of inductor L1 402. A second terminal of inductor L1 402 is coupled to a first terminal of switch S1 404 and a first terminal of switch S2 406. A second terminal of switch S1 404 is coupled to a first terminal of switch S7 416. A second terminal of switch S7 416 is coupled to a first terminal of inductor L2 428. A second terminal of switch S2 406 is coupled to a first terminal of switch S8 418. A second terminal of switch S8 is also coupled to the first terminal of inductor L2 428. The capacitor C1 420 is coupled between the input 102 and the neutral line 305.

A first terminal of switch S3 408 is coupled to the second terminal of switch S1 404. A second terminal of switch S3 408 is coupled to a first terminal of capacitor C3 422. A second terminal of capacitor C3 422 is coupled to the neutral line 305. A first terminal of switch S5 412 is coupled to the first terminal of switch S7 416. A second terminal of switch S5 412 is coupled to the neutral line 305. A first terminal of switch S4 410 is coupled to the second terminal of switch S2 406. A second terminal of switch S4 410 is coupled to a first terminal of capacitor C4 424. A second terminal of capacitor C4 424 is coupled to the neutral line 305. A first terminal of switch S6 414 is coupled to the first terminal of switch S8 418. A second terminal of switch S6 414 is coupled to the neutral line 305. A second terminal of inductor L2 428 is coupled to the output 112. The capacitor C2 is coupled between the neutral line 305 and the output 112.

Operation of the series of switches (S1-S8) 404-418 (e.g., by the controller 116) allows the circuit 400 to run in hybrid and/or traditional modes as discussed above. The switches (S1-S8) 404-418 allow the circuit 400 to guide current from the PFC circuit 104 to either the DC bus 106 or directly to the inverter 110. The controller 116 of the circuit 400 operates the switches (S1-S8) 404-418 to control alternating current from the PFC circuit 104 to the inverter 110 (i.e., bypassing the DC bus 106) and/or direct current from the PFC circuit 104 to the DC bus 106.

For example, during operation of the circuit 400, the switch S7 416 is generally closed, thereby enabling PFC current from the input 102 to the output 112 to bypass the DC bus 106 via the diode 430 of switch S1 404 and the closed switch S7 416. Bypassing the DC bus 106 may minimize choke core losses and switching losses, as well as reduce conduction losses. The controller 116 operates the series of switches (S1-S8) 404-418 (i.e., controls the duty cycles of the switches 404-418) to make desired adjustments to the PFC input current and the inverter current. Typically, only minor correction by the controller 116 is necessary 116 to generate desired PFC and inverter currents.

If PFC current of the circuit 400 needs to be increased, the controller 116 may increase the duty cycle of switch S5 412. By increasing the duty cycle of switch S5 412, the PFC current from the input 102 to the neutral line 305 via the diode 430 of switch S1 404 and switch S5 412 increases. If PFC current of the circuit 400 needs to be reduced, the controller 116 may increase the duty cycle of switch S3 408. By increasing the duty cycle of switch S3 408, a larger portion of inverter current is drawn from the DC bus 106 and the PFC current through switch S1 404 may be reduced.

If inverter current needs to be increased, the controller 116 may increase the duty cycle of switch S3 408 while keeping switch S7 416 closed. By increasing the duty cycle of switch S3 408 while switch S7 416 is closed, more current is drawn from the DC bus 106 and the inverter current increases. If inverter current needs to be reduced, the duty cycle of switch S7 416 may be reduced while switch S6 414 is on. As a result, PFC current will free-wheel to the DC bus 106 and inverter current will free-wheel through switch S6 414 and switch S8 418 to the neutral line 305, thereby reducing the inverter current.

As can be seen in the scenarios described above, in addition to the DC-bus coupled switches (i.e., switches S3 408/S4 410), the neutral-clamp switches (i.e., switches S5 412/S6 414) are utilized by both the PFC circuit 104 and the inverter 110 (i.e. "shared") and control of the neutral clamp switches S5 412/S6 414 controls both the PFC circuit 104 and the inverter 110. Control of the neutral-clamp switches is discussed in greater detail below with regard to Table 1.

current from the input 102 via the diode 430 of switch S1 404. If the PFC current still needs to be increased and the duty cycle of switch S5 412 is equal to 1−D_S3_MIN, the controller 116 increases the duty cycle of switch S2 406 to draw more current from the input 102, until the PFC current is increased to a desired level (e.g., the reference PFC current level).

If the inverter current needs to be reduced (e.g., because a measured inverter current level is greater than a reference inverter current level), the controller 116 first reduces the duty cycle of switch S3 408 to draw less current from the DC bus 106 (and provide less current from the DC bus 106 to the inverter 110). If the inverter current still needs to be reduced and the duty cycle of switch S3 408 is equal to D_S3_MIN, the controller 116 reduces the duty cycle of switch S7 416

TABLE 1

Steps to reduce/increase PFC and inverter currents.

| PFC | Inverter |
|---|---|
| Steps to reduce PFC current. | Steps to reduce inverter current. |
| Conditions: $I_{PFC\_measured} > I_{PFC\_ref} > 0$, Vin = Vout > 0 V | Conditions: $I_{INV\_measured} > I_{INV\_ref} > 0$, Vin = Vout > 0 V. |
| 1. Reduce S2 duty-cycle. <br> IF S2 duty-cycle = 0%, go to next step → | 1. Reduce S3 duty-cycle <br> IF S3 duty-cycle = D_S3_MIN, go to next → |
| 2. Reduce S5 duty-cycle. <br> IF S5 duty-cycle = 0%, go to next step → | 2. Reduce S7 duty-cycle until desired current level is reached (while S6 is turned ON). |
| 3. Increase S3 duty-cycle until desired current level is reached. | |
| Steps to increase PFC current. | Steps to increase inverter current. |
| Conditions: $I_{PFC\_measured} < I_{PFC\_ref} > 0$, Vin = Vout > 0 V. | Conditions: $I_{INV\_measured} < I_{INV\_ref} > 0$, Vin = Vout > 0 V. |
| 1. Reduce S3 duty-cycle <br> IF S3 duty-cycle = D_S3_MIN, go to next step → | 1. Increase S7 duty-cycle <br> IF S7 duty-cycle is 100%, go to next step → |
| 2. Increase S5 duty-cycle. <br> IF S5 duty-cycle = (1-D_S3_MIN), go to next → | 2. Increase S3 duty-cycle until desired current level is reached. |
| 3. Increase S2 duty-cycle until desired current level is reached. | |

Table 1 shows one embodiment of steps implemented in the circuit 400 to reduce/increase PFC and inverter currents with regard to D_S3_MIN. D_S3_MIN is the minimum duty cycle for switch S3 408 which can be set by the PFC circuit 104, the inverter 110, or the controller 116. The controller 116 monitors the input current of the PFC circuit 104 (i.e., the PFC current) and the output current of the inverter 110 (i.e., the inverter current).

As seen in Table 1, if the PFC current needs to be reduced (e.g., because a measured PFC current level is greater than a reference PFC current level), the controller 116 first reduces the duty cycle of switch S2 406 to reduce the PFC current from the input 102 via the diode 430 of switch S6 414. If the PFC current still needs to be reduced and the duty cycle of switch S2 406 is 0%, the controller 116 reduces the duty cycle of switch S5 412 to draw less current from the input 102 via the diode 430 of switch S1 404. If the PFC current still needs to be reduced and the duty cycle of switch S5 412 is 0%, the controller 116 increases the duty cycle of switch S3 408, to draw more current from the DC bus 106 (and less from the input 102 via the diode 430 of switch S1 404), until the PFC current is reduced to a desired level (e.g., the reference PFC current level).

If the PFC current needs to be increased (e.g., because a measured PFC current level is less than a reference PFC current), the controller 116 first reduces the duty cycle of switch S3 408 to draw less current from the DC bus 106 (and more from the input 102 via the diode 430 of switch S1 404). If the PFC current still needs to be increased and the duty cycle of switch S3 408 is equal to D_S3_MIN, the controller 116 increases the duty cycle of switch S5 412 to draw more (while switch S6 414 is closed (i.e., has a duty cycle of 100%)) to draw less current from the PFC circuit 104 (i.e., from the input 102 via the diode 430 of switch S1 404), until the inverter current is reduced to a desired level (e.g., the reference inverter current level).

If the inverter current needs to be increased (e.g., because a measured inverter current level is less than a reference inverter current level), the controller 116 first increases the duty cycle of switch S7 416 to draw more current from the PFC circuit 104 (i.e., from the input 102 via the diode 430 of switch S1 404). If the inverter current still needs to be increased and the duty cycle of switch S7 416 is 100%, the controller 116 increases the duty cycle of switch S3 408 to draw more current from the DC bus 106 (and provide more current from the DC bus 106 to the inverter 110), until the inverter current is increased to a desired level (e.g., the reference inverter current level).

In the circuit 200 described above, DC-bus coupled switches S7 220 and S8 222 are "shared" by the PFC circuit 104 and the inverter 110. In the circuit 400 described above, in addition to DC-bus coupled switches S3 408 and S4 410, neutral-clamp switches (i.e., switches S5 412/S6 414) are also utilized (i.e. "shared") by both the PFC circuit 104 and the inverter 110 (i.e., operation of switches S5 412/S6 414 controls both the PFC circuit 104 and the inverter 110). By "sharing" the neutral-clamp switches (i.e., switches S5 412/S6 414) between the PFC circuit 104 and the inverter 110, two additional neutral-clamp switches may be omitted from the circuit 400. As also described above, in some embodiments, switches S1 404/S2 406 may also be utilized for neutral clamping for the converter 104.

Various aspects and functions described herein may be implemented in one or more controllers or apparatuses configured to control one or more UPS systems. In various embodiments, controllers disclosed herein may be included in one or more UPS systems or may be separate from one or more UPS systems being controlled.

At least some embodiments described above provide hybrid circuits in UPSs. In other embodiments the hybrid circuits may be used in types of power supplies and in other devices.

Furthermore, various aspects and functions described herein in accord with the present disclosure may be implemented as hardware, software, or a combination of hardware and software on one or more computer systems. The one or more computer systems may be configured to communicate with the one or more UPS systems being controlled. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the invention is not limited to any particular distributed architecture, network, or communication protocol. Furthermore, aspects in accord with the present invention may be implemented as specially-programmed hardware and/or software.

The hybrid circuit described above can be suitable for 208V and 400/480V systems. For example, in some 400V systems, the switches S3 408, S4 410, S5 412, and S6 414 are 600V rated components, while switches S1 404, S2 406, S7 416, and S8 418 are rated for 1200V breakdown voltage. In some 208V systems, all components are 600V rated.

In some other embodiments, the UPS 100 may include a separate DC-DC converter for providing power to and receiving power from the battery 108 to the DC-bus 106.

As described above, Table 1 shows one embodiment of steps to reduce/increase PFC and inverter currents; however, in other embodiments, the order and/or configuration of the steps may be defined differently.

While several example topologies have been discussed, numerous other topologies can implement the features of the disclosure, providing a hybrid mode that bypasses the DC bus and allows current to pass from the PFC circuit to the inverter circuit without AC to DC conversion. For example, in some embodiments, the bypassing of the DC bus can be achieved as similarly described in International Patent Application No. PCT/US13/67478, titled "Power Supply Control," which is hereby incorporated herein by reference in its entirety.

The hybrid mode described above allows a UPS to provide filtering and control of input current, output current, and output voltage, as well as provide surge handling capability. The topology described with regard to FIG. 4 provides full control of input power factor and output voltage while having a lower overall level of hardware complexity and cost (due to the "shared" neutral clamp switches). The circuit 400 may also reduce switching losses as current in the "shared" neutral camp switches (i.e., switches S5 412/S6 414) during turn-on or turn-off, is only equal to the difference between the PFC and inverter currents (which is typically low). In addition, the risk of overvoltage in circuit 400 may be lower as the neutral-clamp switch voltage is clamped through a single diode.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A power supply system comprising:
   an input configured to receive input power from an input power source;
   an output configured to provide output power to a load;
   a power factor correction circuit coupled to the input and configured to draw input current from the input;
   an inverter having a first connection and a second connection, the second connection of the inverter being coupled to the output and configured to provide output current to the output;
   a bus selectively coupled to the power factor correction circuit and to the first connection of the inverter; and
   a switching circuit coupled to the inverter, the switching circuit configured to direct first power from the input to the first connection of the inverter to bypass the bus in a first mode of operation and to direct second power from the bus to the first connection of the inverter in a second mode of operation,
   wherein the switching circuit includes a neutral clamp circuit coupled to the power factor correction circuit and the inverter, the neutral clamp circuit configured to control a level of the input current drawn by the power factor correction circuit and a level of the output current provided by the inverter to the output.

2. The power supply system of claim 1, wherein the switching circuit is configured to direct an alternating current from the power factor correction circuit to the first connection of the inverter in the first mode of operation, bypassing the bus.

3. The power supply system of claim 1, further comprising a controller coupled to the switching circuit and configured to provide control signals to the switching circuit.

4. The power supply system of claim 3, wherein the controller is configured to:
   monitor at least one electrical characteristic of the power supply system; and
   provide control signals to operate the switching circuit in at least one of the first mode of operation, the second mode of operation, and a combination of the first and second modes of operation, based on the at least one electrical characteristic.

5. The power supply system of claim 4, wherein in providing control signals to operate the switching circuit, the controller is further configured to provide control signals to the neutral clamp circuit to adjust a duty cycle of the neutral clamp circuit to regulate at least one of the level of the input current drawn by the power factor correction circuit and the level of the output current provided by the inverter to the output.

6. The power supply system of claim 4, wherein in providing control signals to operate the switching circuit, the controller is further configured to provide control signals to the switching circuit to adjust a duty cycle of the switching circuit to control an amount of power being transferred between the power factor correction circuit, the bus, and the inverter.

7. The power supply system of claim 3, wherein the controller is further configured to:
monitor the input current drawn by the power factor correction circuit;
determine whether the input current drawn by the power factor correction circuit is less than a reference input current level; and
provide, in response to determining that the input current drawn by the power factor correction circuit is less than the reference input current level, control signals to the neutral clamping circuit to increase a first duty cycle of the neutral clamping circuit to increase the input current drawn by the power factor correction circuit.

8. The power supply system of claim 7, wherein the controller is further configured to provide, in response to determining that the input current drawn by the power factor correction circuit is greater than the reference input current level, control signals to the neutral clamping circuit to decrease the first duty cycle of the neutral clamping circuit to decrease the input current drawn by the power factor correction circuit.

9. The power supply system of claim 7, wherein the controller is further configured to:
determine whether the output current provided by the inverter is less than a reference output current level; and
provide, in response to determining that the output current provided by the inverter is less than the reference output current level, control signals to the switching circuit to increase a duty cycle of the switching circuit to increase the output current provided by the inverter.

10. The power supply system of claim 9, wherein the controller is further configured to provide, in response to determining that the output current provided by the inverter is greater than the reference output current level, control signals to the neutral clamping circuit to increase a second duty cycle of the neutral clamping circuit to decrease the output current provided by the inverter.

11. The system of claim 1, wherein the switching circuit includes a switch configured to be in an open position to bypass the bus in the first mode of operation.

12. A method of controlling a power supply system comprising an input configured to receive input power from an input power source, an output configured to provide output power to a load, a power factor correction circuit coupled to the input and configured to draw input current from the input, an inverter having a first connection and a second connection, the second connection being coupled to the output and configured to provide output current to the output, a bus selectively coupled to the power factor correction circuit and the first connection of the inverter, and a switching circuit coupled to the inverter, the switching circuit including a neutral clamp circuit coupled to the power factor correction circuit and the inverter, the method comprising:
determining one or more electrical characteristics of the power supply system;
based on determining, providing control signals to operate the switching circuit in a first mode of operation to direct first power from the input to the first connection of the inverter to bypass the bus;
based on determining, providing control signals to operate the switching circuit in a second mode of operation to direct second power from the bus to the first connection of the inverter; and
based on determining, providing control signals to operate the neutral clamp circuit to regulate a level of the input current drawn by the power factor correction circuit and a level of the output current provided by the inverter to the output.

13. The method of claim 12, wherein operating the switching circuit in the first mode of operation comprises directing an alternating current from the power factor correction circuit to the first connection of the inverter, bypassing the bus.

14. The method of claim 12, wherein providing control signals includes providing the control signals to operate the switching circuit in at least one of the first mode of operation, the second mode of operation, and a combination of the first and second modes of operation based on the one or more electrical characteristics.

15. The method of claim 14, wherein providing control signals to operate the neutral clamp circuit includes providing the control signals to the neutral clamp circuit to control a duty cycle of the neutral clamp circuit to regulate the level of the input current drawn by the power factor correction circuit and the level of the output current provided by the inverter to the output.

16. The method of claim 14, wherein providing control signals includes providing the control signals to the switching circuit to adjust a duty cycle of the switching circuit to control an amount of power being transferred between the power factor correction circuit, the bus, and the inverter.

17. The method of claim 12, wherein determining one or more electrical characteristics comprises:
monitoring the input current drawn by the power factor correction circuit; and
determining whether the input current drawn by the power factor correction circuit is less than a reference input current level,
wherein providing control signals to operate the neutral clamp circuit includes providing, in response to determining that the input current drawn by the power factor correction circuit is less than the reference input current level, control signals to the neutral clamping circuit to increase a first duty cycle of the neutral clamping circuit to increase the input current drawn by the power factor correction circuit.

18. The method of claim 17, wherein providing control signals to operate the neutral clamp circuit includes providing, in response to determining that the input current drawn by the power factor correction circuit is greater than the reference input current level, control signals to the neutral clamping circuit to decrease the first duty cycle of the neutral clamping circuit to decrease the input current drawn by the power factor correction circuit.

19. The method of claim 17, wherein determining one or more electrical characteristics comprises:
monitoring the output current provided by the inverter; and
determining whether the output current provided by the inverter is less than a reference output current level,
wherein providing control signals to operate the switching circuit includes providing, in response to determining that the output current provided by the inverter is less than the reference output current level, control signals to the switching circuit to increase a duty cycle of the switching circuit to increase the output current provided by the inverter.

20. The method of claim 19, wherein providing control signals to operate the neutral clamp circuit includes providing, in response to determining that the output current provided by the inverter is greater than the reference output current level, control signals to the neutral clamping circuit to increase a second duty cycle of the neutral clamping circuit to decrease the output current provided by the inverter.

21. A power supply system comprising:
an input configured to receive input power from an input power source;
an output configured to provide output power to a load;
a power factor correction circuit coupled to the input and configured to draw input current from the input;
an inverter having a first connection and a second connection, the second connection of the inverter being coupled to the output and configured to provide output power to the output;
a DC bus selectively coupled to the power factor correction circuit and the first connection of the inverter; and
means for operating the power supply system in a hybrid mode to generate desired input and output power of the power supply system, the hybrid mode including providing power to the first connection of the inverter and bypassing the DC bus, and means for controlling a level of the input current drawn by the power factor correction circuit and a level of the output current provided by the inverter with a shared portion of the power supply system.

* * * * *